UNITED STATES PATENT OFFICE.

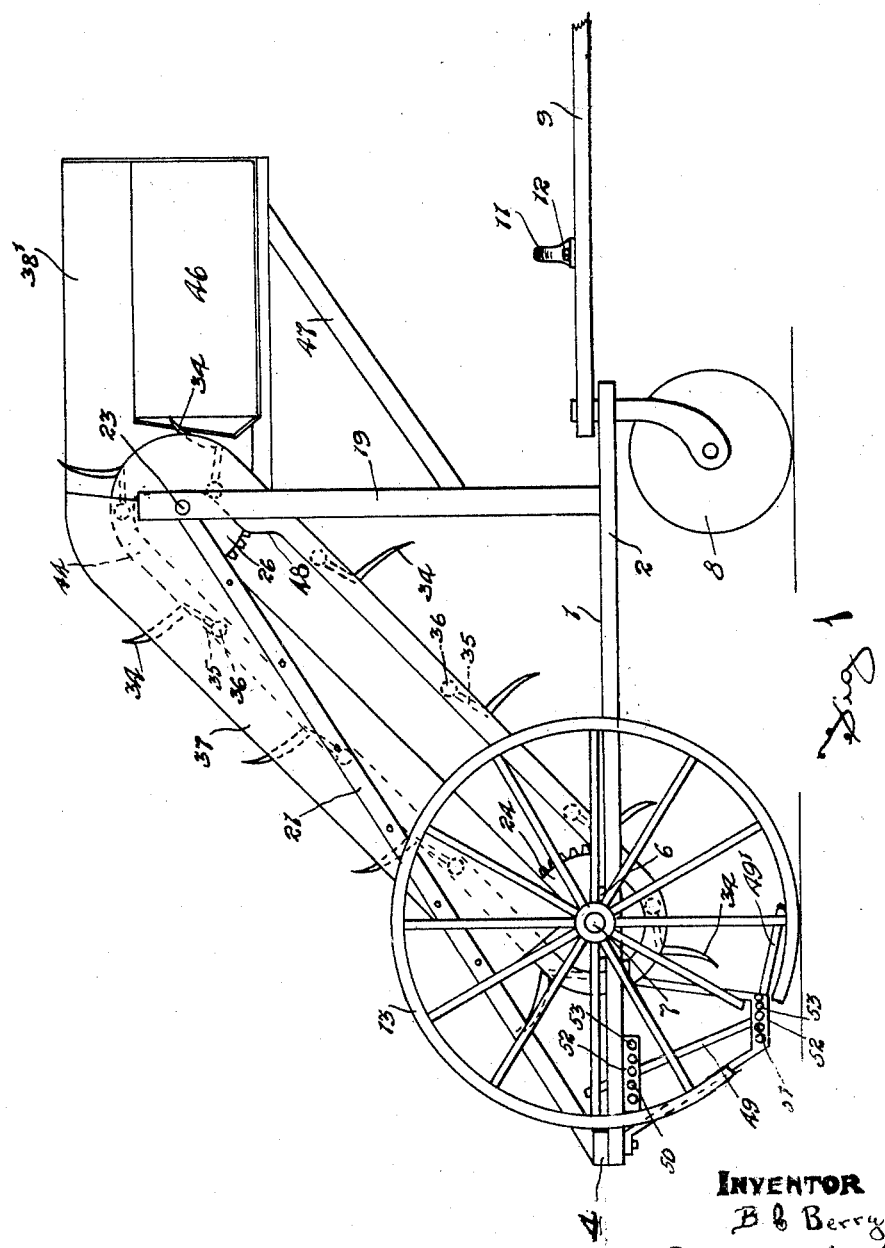

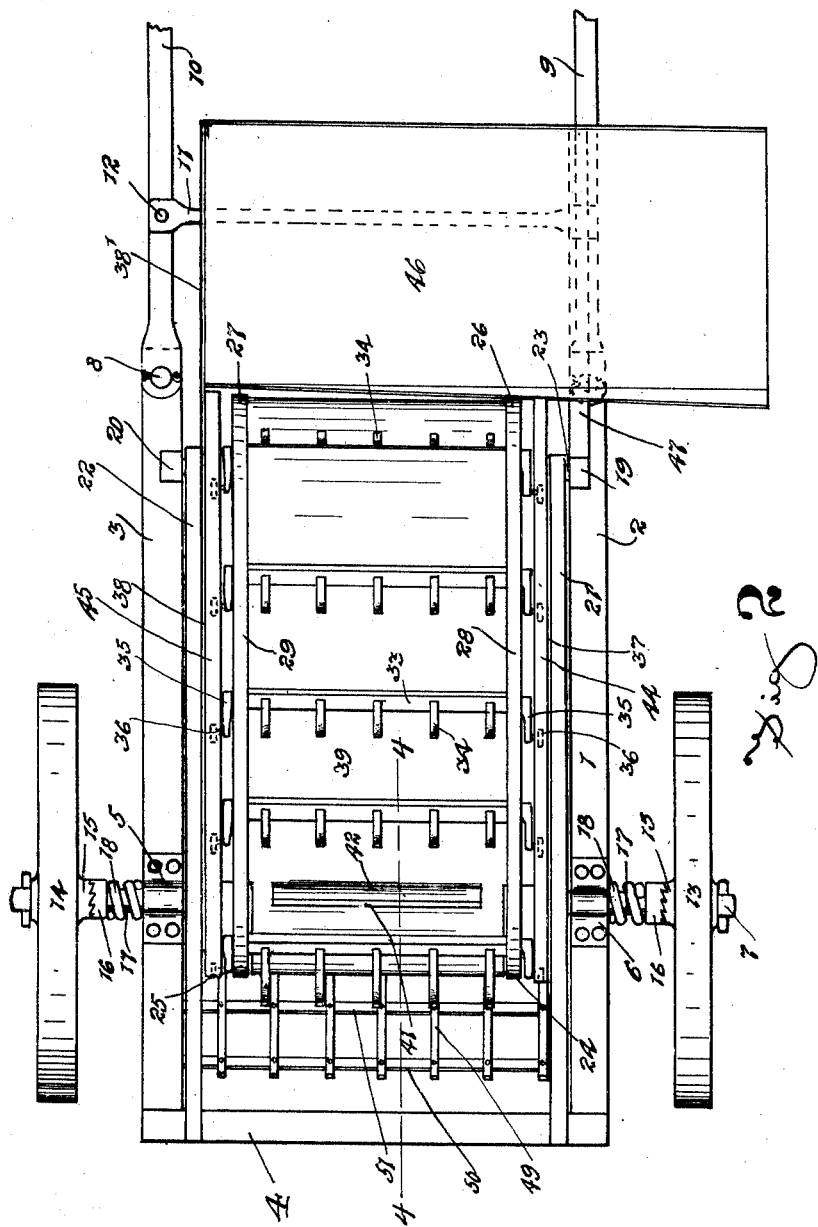

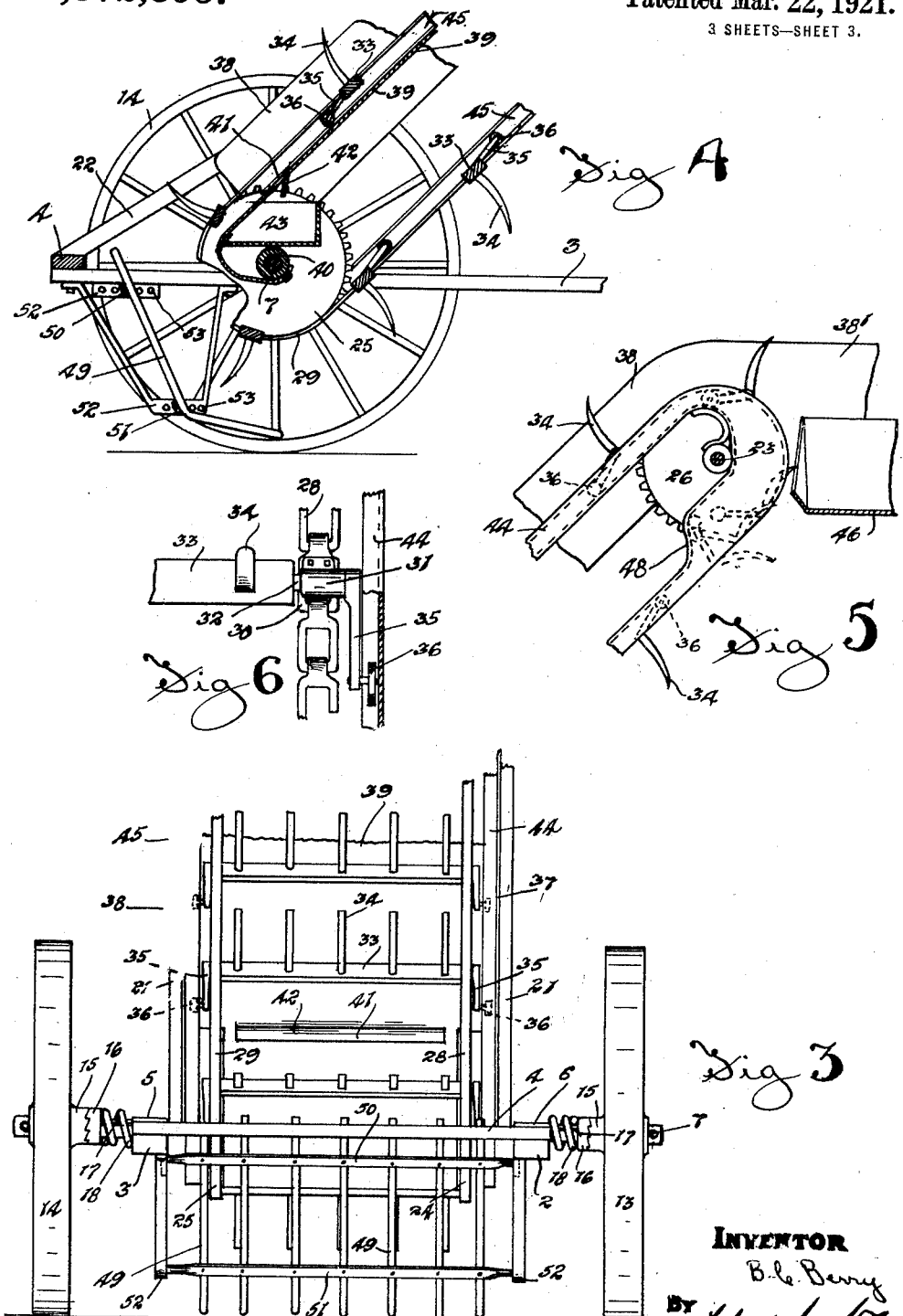

BERT CLEMENT BERRY, OF CALGARY, ALBERTA, CANADA, ASSIGNOR OF TWO-FIFTHS TO FREDERICK ERNEST KING AND ERNEST GAUNTLETT PESCOD, BOTH OF CALGARY, ALBERTA, CANADA.

SHEAF-LOADER.

1,372,395. Specification of Letters Patent. Patented Mar. 22, 1921.

Application filed July 17, 1918. Serial No. 245,352.

*To all whom it may concern:*

Be it known that I, BERT CLEMENT BERRY, of the city of Calgary, in the Province of Alberta, Canada, have invented certain new and useful Improvements in Sheaf-Loaders, of which the following is the specification.

The invention relates to improvements in sheaf loaders and the principal object of the invention is to provide a machine which can be pulled along the ground and will gather the sheaves and elevate them to a convenient position for loading and after elevating will deliver them to the side so that they can be conveniently dropped into an accompanying wagon rack.

A further object of the invention is to construct a machine so that it will not unduly disturb the sheaves in lifting and elevating them and a further object is to construct the machine with a gathering pan which will catch over-ripe grain dropping on to the elevator.

A still further object of the invention is to arrange the gathering forks of the machine so that they can be adjusted to accommodate large or small sheaves as occasion may demand.

A still further object is to control the lifting prongs to clear the sheaf at the time the sheaf is delivered to the chute, thereby avoiding mutilating the sheaf and shaking out the grain in the head.

With the above more important objects in view the invention consists essentially in the arrangement and construction of parts hereinafter more particularly described and later pointed out in the appended claims, reference being had to the accompanying drawings in which:—

Figure 1 represents a side elevation of the complete machine.

Fig. 2 represents a plan view of the same.

Fig. 3 represents a rear elevation with the upper part of the machine broken away.

Fig. 4 represents a vertical sectional view taken on the plane of line 4—4' of Fig. 2.

Fig. 5 represents a side view of the upper end of the elevator with the top shaft and chute in vertical section.

Fig. 6 represents an enlarged detailed plan view of a portion of the conveyer showing the roller in the channel.

In the drawings like characters of reference indicate corresponding parts in the several figures.

1 represents the frame of the machine which comprises side beams 2 and 3 connected by a rearwardly disposed rear beam 4 and with the side beams fitted with rearwardly disposed bearings 5 and 6 which receive rotatably the main cross shaft 7.

The forward end of each of the beams 2 and 3 is supported by a swiveled caster wheel 8 to each of which I connect a forwardly extending tongue indicated at 9 and 10, the arrangement being such that when the tongues are swung sidewise the caster wheels are turned to steer the machine. The tongues are connected by a yoke bar 11 pivotally connected by pivot bolts 12 to the tongues.

On the ends of the main shaft I mount rotatably the driving ground wheels 13 and 14 which wheels have the hubs thereof supplied in each instance with a clutch member 15. These clutch members are designed to engage with further clutch members 16 feathered on the shaft as indicated at 17 and normally press into engagement with the clutch members 15 by the action of coil springs 18. According to this arrangement it will be apparent that as the machine is pulled ahead along the ground the wheels 13 and 14 in rotating will cause the main shaft to rotate, this due to the engagement of the clutch members, the clutches 15 driving clutch members 16 which in turn will drive the shaft by virtue of the feathers.

However, in making a turn it will be obvious that the clutch members at the slow moving side of the machine are free to click past one another, while the outer pair of clutch members are driving the shaft. Further, should the machine be backed up the shaft will not be driven as at this time both the pairs of clutches will click past one another.

I have not considered it necessary to enlarge on the details of this particular part of the machine as the construction is well known and accordingly well understood.

Forwardly of the machine I erect two side posts 19 and 20, to the upper ends of which I attach rearwardly extending side braces 21 and 22 which have their rear ends secured to the cross beam 4. The posts carry rotatably an upper cross shaft 23 and on the shafts 7 and 23 I mount pairs of chain wheels 24 and 25, 26 and 27 which are connected by endless side chains 28 and 29. The side chains are each supplied at suitable intervals with a special link 30, such being best shown in Fig. 6 of the drawings and these links appear in opposing pairs and they are supplied each with a bearing 31 receiving a short spindle 32 projecting from the adjacent end of a cross slat 33 extending between the chains. The cross slats are supplied with a plurality of extending equispaced prongs 34 and the ends of the spindles 32 beyond the chains are fitted with cranks 35 carrying trailing rollers 36.

The side braces 21 and 22 of the machine support side shields 37 and 38 which are preferably formed from sheet metal and between the side shields I locate a cross plate 39 over the top side of which the ascending side of the conveyer operates. The lower end of this plate is turned inwardly toward the axle 7 and is permanently secured to a tube or sleeve 40 mounted on the axle. The lower end of the plate is cross slotted at 41 and is provided adjacent the slot with a deflector 42 which is adapted to deliver any loose grain deposited on the plate to the collecting pan 43 mounted on the sleeve 40 and connected to the plate.

In order to control the prong slats, which owing to the arrangement previously disclosed are pivotally carried by the chains, I have provided at the opposite sides of the machine stationary guides which receive the rollers and control them as the conveyer operates. These guides, which are indicated generally by the reference numerals 44 and 45, are for the greater part in the nature of channel irons and of such a size that the rollers are received between and ride on the flanges of the channel irons. The guides at the back end of the machine are concentric to the axle 7 and do not vary in width and are arranged such that as the slats pass around the axle the controlling rollers operating in the guides keep the prongs extended in a position more or less radial to the axle. At the upper or discharging end of the elevator the guides widen out to allow the rollers a limited amount of play and to permit of the prongs passing around the upper shaft while maintaining approximately a more or less vertical position. This arrangement makes it possible for the prongs to clear the sheaves and also to freely pass the side delivering chute 46 which is suspended in an elevated position adjacent the upper end of the elevator by a suitable bracket 47 secured to the post 19 and by an extension 38' of the side shield 38.

In connection with the roller control at the upper end of the elevator it will be observed that as the prongs turn around the top shaft the rollers are freed to a limited extent to allow the prongs to rock and that when the prongs are about to descend on the underside the rollers are tripped by an abrupt shoulder indicated at 48 in the guides which swings the prongs ahead to a position at right angles to the chain and redirects the rollers back into the normal or narrow width portions of the guides.

At the rear of the machine I locate a set of gathering forks 49 which pass completely across the machine and within the frame and have their lower ends bent forwardly and terminated in a location more or less directly below the main axle and just clear of the ground. These forks are preferably adjustable in a direction forwardly or backwardly of the machine frame and in the present instance this is effected by projecting the ends of the upper and lower cross bars 50 and 51 which carry the prongs into side supports 52 secured to the frame and provided with adjustment openings 53 to receive the projected ends of the bars.

The details of the particular suspension for the rear forks which allows of the forward and rear adjustment are of minor importance as it will be readily understood various arrangements could be supplied to carry the forks and allow them to be moved forwardly or backwardly in respect to the frame.

When this machine is to be used the draft animals are hitched to the outer sides of the posts and the machine is pulled along the ground, being directed to the sheaves on the field. The sheaves are passed in the advancement of the machine in between the tongues and within the frame, which is open at the front, and here it is to be understood that the yoke bar is sufficiently high to clear the sheaves.

As the machine draws up to the sheaf the forks pass into the lower part of the butt, thereby gathering the sheaf from the ground. At about the time the sheaf is on the lower ends of the forks it is caught by the prongs and swept backwardly toward the upwardly extending parts of the forks which prevent the sheaf from being thrown backwardly. As the prongs travel the sheaf is carried up by them and elevated over the top side of the cross plate 39. During the upward travel of the sheaf on the elevator the prongs are held against upsetting backwardly by the trailing rollers which are controlled by the guides. At the upper end of the elevator or conveyer the sheaf is deposited from the elevator into the inclined chute 46 which delivers the sheaf to the side and here it will be understood that the sheaf is dropped into the rack of an accompanying wagon.

Owing to the special construction of the guides at the upper end of the conveyer the prongs are free to withdraw from the sheaf so that it is thrown clear into the chute.

The forks can be adjusted at any time forwardly or backwardly to accommodate big or small sheaves, depending on the nature of the crop.

What I claim as my invention is:—

1. A sheaf loader comprising a wheeled frame open at the front, a forwardly directed inclined elevator mounted on the frame and having the lowermost end adjacent the rear end of the frame, said elevator being provided with extending prongs, a plurality of spaced similar gathering forks located at the rear of the machine and with their lower ends adjacent the ground and turned forwardly beneath the lower end of the elevator, cross bars connecting the forks at top and bottom and located at the rear side thereof, side supports secured to the frame and provided with adjusting openings receiving the ends of the cross bars and means for driving the elevator to cause the prongs to catch and elevate the sheaves gathered by the forks.

2. In a sheaf loader, the combination with a wheeled frame open at the front and an inclined elevator having the lowermost end located toward the rear of the frame, of side supports secured to the rear end of the frame and presenting opposing sets of horizontally disposed adjusting openings, upper and lower cross bars adjustably carried by the side supports, the ends of the bars entering the openings and a plurality of similar gathering forks secured to the bars and having their lower ends inclining forwardly clear of the ground and beneath the end of the elevator.

Signed at Calgary, this 17th day of June 1918.

BERT CLEMENT BERRY.

In the presence of—
  LILLY LEWIS,
  MYRILE PURDY.